May 14, 1929.  D. L. JACOBSON  1,713,045
PROCESS OF PRODUCING OXIDES OF NITROGEN FROM AMMONIACAL LIQUOR
Filed Aug. 22, 1927
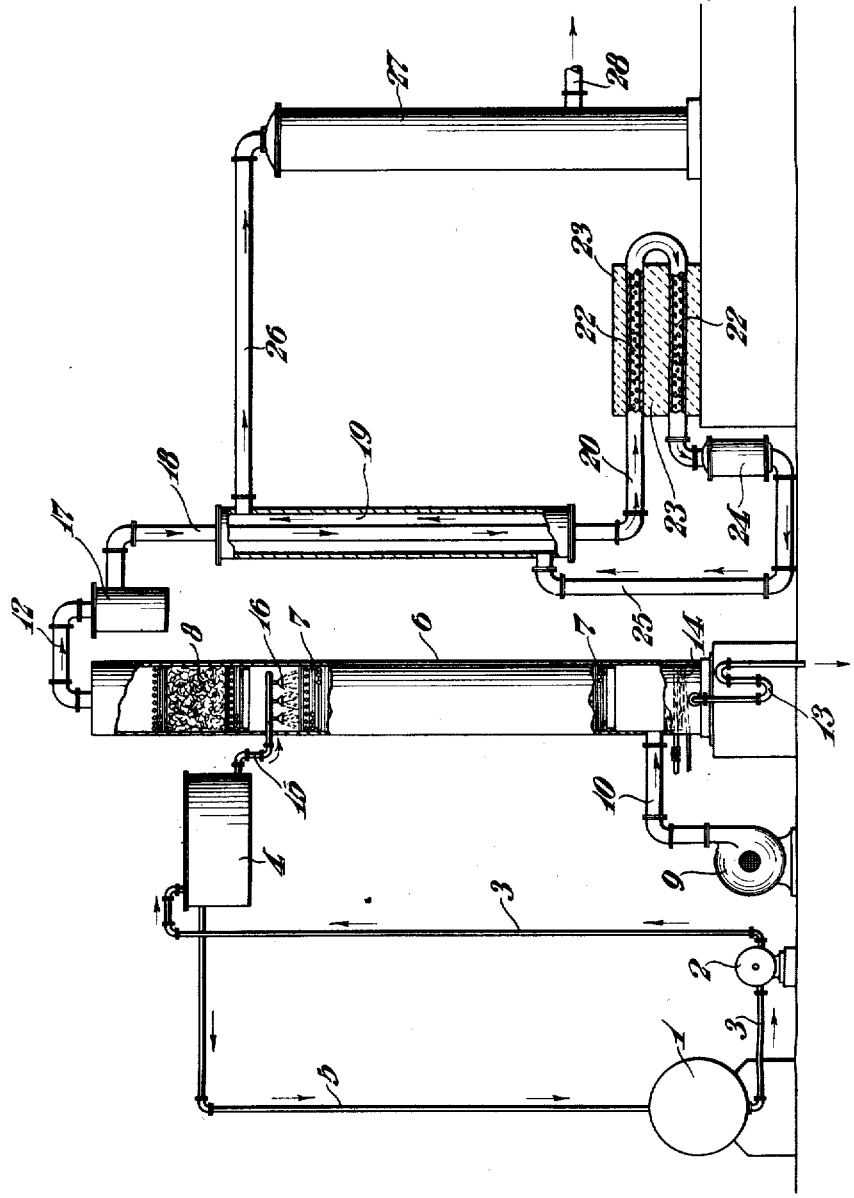
INVENTOR.
David L. Jacobson.
BY
Jesse R. Langley
ATTORNEY Patented May 14, 1929.

1,713,045

UNITED STATES PATENT OFFICE.

DAVID L. JACOBSON, OF PITTSBURGH, PENNSYLVANIA, ASSIGNOR TO THE KOPPERS COMPANY, A CORPORATION OF DELAWARE.

PROCESS OF PRODUCING OXIDES OF NITROGEN FROM AMMONIACAL LIQUOR.

Application filed August 22, 1927. Serial No. 214,634.

This invention relates to the production of oxides of nitrogen from ammonia, and more particularly from ammoniacal liquor containing sulphides.

My invention has for an object to provide a process whereby such a source of ammonia may be utilized without danger to the catalyst used for converting a mixture of ammonia gas and air into oxides of nitrogen, as well as such other improvements in operative advantages and results as may hereinafter be found to obtain.

The oxides of nitrogen, NO and $NO_2$, find important uses in the chemical industries, particularly in the manufacture of sulphuric and nitric acids. While in the past Chilean nitrate has been utilized as the principal source of the oxides of nitrogen, for various economic reasons it is now highly and increasingly desirable to produce these oxides from ammonia. The oxidation of ammonia at high temperatures in the presense of a platinum catalyst for the production of NO and $NO_2$ is now well known, and has already attained considerable commercial importance, both in the manufacture of nitric acid, and in supplying nitric oxide to sulphuric acid plants of the chamber process type.

The great source of ammonia in this country and others remains in the distillation of coal in by-products coke ovens and gas plants. But when these plants produce ammonia in the liquid form it is generally as "crude concentrated liquor", containing considerable amounts of hydrogen sulphide.

In manufacturing the oxides of nitrogen from ammonia, considerable savings can be effected when ammonia liquor rather than anhydrous ammonia is utilized as a source of nitrogen, and this is especially true when crude ammoniacal liquor is utilized. However, the volatile sulphides present in crude liquor obtained from coal carbonization, being liberated with the ammonia, impair the sensitive and costly platinum catalyst used to promote oxidation of the ammonia.

In the process of my invention, I provide for the successful use of crude ammoniacal liquor as a source of ammonia by accomplishing the oxidation of hydrogen sulphide liberated with the ammonia substantially without affecting the ammonia itself. This is accomplished by passing the ammoniacal vapor over a suitable catalyst, such as aluminum oxide or a material containing the same, maintained at a proper temperature. The resultant products of oxidation, such as sulphur dioxide, appear to exert no harmful effect upon the platinum catalyst, and may find a value in the subsequent use of the oxides of nitrogen, as will hereinafter be shown.

In order that my invention may be clearly set forth and understood, I now describe, with reference to the accompanying drawing, which illustrates a preferred embodiment of my invention, the preferred manner in which it is carried out and performed. In this drawing, The single figure is a view, partially in elevation and partially in section, and being more or less diagrammatic in character, of apparatus for producing oxides of nitrogen from ammoniacal liquor in accordance with my invention.

Referring to the drawing, crude ammoniacal liquor is maintained in a storage tank 1, and is lifted by a pump 2 through a conduit 3 into an overhead constant level supply tank 4, that is provided with an overflow line 5, leading back to the tank 1.

Liberation of ammonia from the liquor is accomplished in a stripping tower 6, that is provided in its lower part with any suitable contact material or tower packing 7, and in its upper part with other tower packing 8. The tower 6 is supplied with air from a blower 9, with which it communicates through a conduit 10, and is provided with a vapor exit conduit 12 and a sealed liquor outflow conduit 13.

The ammoniacal liquor flows from the constant level supply tank 4 through a conduit 15, entering the tower 6 in the space between the packings 7 and 8, and is distributed over the lower packing 7 through sprays 16. The liquor descends through the packing 7 in contact with a rising stream of air from the blower 9, thereby losing its ammonia as well as any volatile sulphides, and collects in the bottom of the tower 6, where it may be heated by means of a steam coil 14 before it passes out of the tower 6 through conduit 13, to ensure a complete removal of ammonia.

The mixture of air and ammonia now traverses the upper packing 8, whereby any entrained liquid is removed, and passes from tower 6 through conduit 12 into a filter 17, for further thorough removal of any entrained solid or liquid. The gas mixture then passes through a conduit 18, a heat exchanger 19 and a conduit 20 into a preliminary catalyst chamber 22.

The preferred catalyst, disposed for adequate contact within the chamber 22, is one which contains aluminum oxide, ($Al_2O_3$). The material used may be pumice, preferably in granular form, or pumice coated with alumina, which may be prepared by spreading or depositing aluminum hydroxide on pumice. When pumice alone is used, it is preferred to maintain the temperature of the catalyst at from about 400° C. to 450° C., while in the case of pumice coated with aluminum oxide, a temperature of as low as about 350° C. may be employed. At these temperatures, the sulphide is completely oxidized and the ammonia is substantially unaffected.

It is usually not difficult to maintain the proper temperatures, but for starting up, in the case of small amounts of sulphide, and other contingencies, the preliminary catalyst chamber 22 may be encased in an insulated electric or other furnace 23. Heat may also be supplied from the hot gas leaving the subsequently traversed platinum catalyst, as in the heat exchanger 19.

The hot gas leaving the preliminary catalyst chamber 22, free of sulphide, now flows directly to the platinum catalyst contained in a converter chamber 24. This may be of any suitable design and is usually maintained at a temperature of from about 800° C. to 1100° C. The mixture of ammonia and air, passing over the catalyst at a rapid rate, probably undergoes a reaction similar to the following:

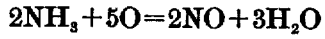

$$2NH_3 + 5O = 2NO + 3H_2O$$

At any rate, NO is produced, which on further cooling may be wholly or partially oxidized to $NO_2$. Any $SO_2$ present probably also oxidizes to $SO_3$ under the influence of the catalyst.

The highly heated gases, after leaving the platinum catalyst, pass through a conduit 25 into the heat exchanger 19, where they give up most of their sensible heat to the gases travelling toward the converter chamber 24, and then pass through a conduit 26 to a cooler 27, where they are cooled, preferably by indirect contact with water or other liquid cooling medium. The gases then leave the system through an outlet conduit 28, passing to the absorption towers of the nitric acid plant, to the lead chambers of the sulphuric acid plant, or to other apparatus for such use as may be required of them.

Inasmuch as, in the manufacture of nitric acid, sulphuric acid is employed for concentrating the weak nitric acid formed in the absorption towers, the sulphur dioxide formed by the oxidation of hydrogen sulphide in the preliminary catalyst chamber 22, and any sulphur trioxide formed therefrom, will find a value if the oxides of nitrogen produced are to be used for the manufacture of concentrated nitric acid. Moreover, it is obvious that this will be equally true when the manufacture of sulphuric acid is contemplated.

A further advantage of the process consists in a saving in heat units, as well as in a low purification cost as compared with other methods of purification.

My invention is not limited to the specific examples given hereinabove but may be variously embodied and practiced within the scope of the claims hereinafter made.

For example, while I have shown and described a process in which volatile constituents are removed from ammoniacal liquor by aeration, the liberation of volatiles may be otherwise accomplished, as, for example, by distillation. Moreover, the air necessary for oxidation of the ammonia may be added in various ways, with or without preheating.

Furthermore, my invention is not limited to the specific catalysts described hereinabove. I have found that, although iron oxide at high temperatures exerts a harmful effect on the ammonia-air mixture, if this material be maintained at a moderate temperature of from about 80° C. to 100° C., no effect on ammonia is observed, while hydrogen sulphide is oxidized and removed from the gas, in this case apparently not as sulphur dioxide but as sulphur, without the production of water vapor.

I claim as my invention:

1. The process of producing oxide of nitrogen from ammoniacal liquor containing sulphide which comprises blowing air through the liquor to produce a gas containing oxygen, nitrogen and ammonia, effecting the oxidation of any hydrogen sulphide present, and then passing the gas over a catalyst to effect a combination of oxygen and nitrogen.

2. The process of producing oxide of nitrogen from ammoniacal liquor containing sulphide which comprises blowing air through the liquor to produce a gas containing oxygen, nitrogen and ammonia, passing the gas over a catalyst effective to oxidize hydrogen sulphide substantially without affecting the ammonia, and effecting a catalysis of the oxygen, nitrogen and ammonia to oxide of nitrogen and water vapor.

3. The process of producing oxide of nitrogen which comprises liberating ammonia from liquor containing it, passing the ammonia with air over a catalyst effective to oxidize any sulphide present and over a further catalyst effective to promote oxidation of ammonia.

4. The process of producing oxide of nitrogen which comprises liberating ammonia from liquor containing it, passing the ammonia with air over a catalyst containing alumium oxide and over a further catalyst effective to promote oxidation of ammonia.

5. The process of producing oxide of nitrogen from ammoniacal liquor containing sulphide which comprises blowing air through the liquor to produce a gas containing oxygen, nitrogen and ammonia, passing the gas over heated pumice to oxidize hydrogen sulphide, and over a platinum catalyst to produce oxide of nitrogen.

6. The process of producing oxide of nitrogen from ammoniacal liquor containing sulphide which comprises blowing air through the liquor to produce a gas containing oxygen, nitrogen and ammonia, passing the gas over a heated catalyst comprising pumice coated with aluminum oxide, to oxidize hydrogen sulphide, and over a platinum catalyst to produce oxide of nitrogen.

7. The process of producing oxide of nitrogen from ammoniacal liquor containing sulphide which comprises blowing air through the liquor to produce a gas containing oxygen, nitrogen and ammonia, passing the gas over a catalyst containing aluminum oxide at a temperature of from about 300° C. to about 450° C., and over a platinum catalyst to produce oxide of nitrogen.

8. The process of producing oxide of nitrogen from ammoniacal liquor containing sulphide which comprises blowing air through the liquor to produce a gas containing oxygen, nitrogen and ammonia, passing the gas over a catalyst comprising pumice coated with alumina at a temperature of from about 300° C. to about 450° C. and over a platinum catalyst to produce oxide of nitrogen.

9. The process of producing oxide of nitrogen from ammoniacal liquor containing sulphide which comprises blowing air through the liquor to produce a gas containing oxygen, nitrogen and ammonia, passing the gas over a catalyst comprising pumice at a temperature of from about 400° C. to about 450° C., and over a platinum catalyst to produce oxide of nitrogen.

10. The process of producing oxide of nitrogen from ammoniacal liquor containing sulphide which comprises liberating ammonia from the liquor, effecting an oxidation of any hydrogen sulphide present therewith, and effecting a catalysis of the ammonia in the presence of oxygen to oxide of nitrogen and water vapor.

11. The process of producing oxide of nitrogen from gas containing ammonia and hydrogen sulphide which comprises subjecting the gas to the action of a catalyst effective to promote the oxidation of hydrogen sulphide substantially without decomposing ammonia, and passing the resultant gas with air over a platinum catalyst at a temperature of from about 800° C. to about 1100° C.

12. The process of producing oxide of nitrogen from gas containing ammonia and hydrogen sulphide which comprises passing the gas over an aluminum oxide catalyst to oxidize hydrogen sulphide, and then passing the gas over a catalyst effective to promote oxidation of the ammonia.

In testimony whereof, I have hereunto subscribed my name this 20th day of August, 1927.

DAVID L. JACOBSON.

CERTIFICATE OF CORRECTION.

Patent No. 1,713,045.　　　　　　　　　　Granted May 14, 1929, to

DAVID L. JACOBSON.

It is hereby certified that error appears in the printed specification of the above numbered patent requiring correction as follows: Page 3, line 9, claim 5, after the word "over" insert the article "a"; and after the word "heated", same line and claim, insert the words "catalyst comprising"; and that the said Letters Patent should be read with these corrections therein that the same may conform to the record of the case in the Patent Office.

Signed and sealed this 2nd day of July, A. D. 1929.

M. J. Moore,
Acting Commissioner of Patents.

(Seal)

nia with air over a catalyst containing alumium oxide and over a further catalyst effective to promote oxidation of ammonia.

5. The process of producing oxide of nitrogen from ammoniacal liquor containing sulphide which comprises blowing air through the liquor to produce a gas containing oxygen, nitrogen and ammonia, passing the gas over heated pumice to oxidize hydrogen sulphide, and over a platinum catalyst to produce oxide of nitrogen.

6. The process of producing oxide of nitrogen from ammoniacal liquor containing sulphide which comprises blowing air through the liquor to produce a gas containing oxygen, nitrogen and ammonia, passing the gas over a heated catalyst comprising pumice coated with aluminum oxide, to oxidize hydrogen sulphide, and over a platinum catalyst to produce oxide of nitrogen.

7. The process of producing oxide of nitrogen from ammoniacal liquor containing sulphide which comprises blowing air through the liquor to produce a gas containing oxygen, nitrogen and ammonia, passing the gas over a catalyst containing aluminum oxide at a temperature of from about 300° C. to about 450° C., and over a platinum catalyst to produce oxide of nitrogen.

8. The process of producing oxide of nitrogen from ammoniacal liquor containing sulphide which comprises blowing air through the liquor to produce a gas containing oxygen, nitrogen and ammonia, passing the gas over a catalyst comprising pumice coated with alumina at a temperature of from about 300° C. to about 450° C. and over a platinum catalyst to produce oxide of nitrogen.

9. The process of producing oxide of nitrogen from ammoniacal liquor containing sulphide which comprises blowing air through the liquor to produce a gas containing oxygen, nitrogen and ammonia, passing the gas over a catalyst comprising pumice at a temperature of from about 400° C. to about 450° C., and over a platinum catalyst to produce oxide of nitrogen.

10. The process of producing oxide of nitrogen from ammoniacal liquor containing sulphide which comprises liberating ammonia from the liquor, effecting an oxidation of any hydrogen sulphide present therewith, and effecting a catalysis of the ammonia in the presence of oxygen to oxide of nitrogen and water vapor.

11. The process of producing oxide of nitrogen from gas containing ammonia and hydrogen sulphide which comprises subjecting the gas to the action of a catalyst effective to promote the oxidation of hydrogen sulphide substantially without decomposing ammonia, and passing the resultant gas with air over a platinum catalyst at a temperature of from about 800° C. to about 1100° C.

12. The process of producing oxide of nitrogen from gas containing ammonia and hydrogen sulphide which comprises passing the gas over an aluminum oxide catalyst to oxidize hydrogen sulphide, and then passing the gas over a catalyst effective to promote oxidation of the ammonia.

In testimony whereof, I have hereunto subscribed my name this 20th day of August, 1927.

DAVID L. JACOBSON.

---

CERTIFICATE OF CORRECTION.

Patent No. 1,713,045.   Granted May 14, 1929, to

DAVID L. JACOBSON.

It is hereby certified that error appears in the printed specification of the above numbered patent requiring correction as follows: Page 3, line 9, claim 5, after the word "over" insert the article "a"; and after the word "heated", same line and claim, insert the words "catalyst comprising"; and that the said Letters Patent should be read with these corrections therein that the same may conform to the record of the case in the Patent Office.

Signed and sealed this 2nd day of July, A. D. 1929.

M. J. Moore,
Acting Commissioner of Patents.

(Seal)